United States Patent Office 2,842,548
Patented July 8, 1958

2,842,548

PIPERAZINE COMPOUNDS AND METHOD OF PREPARATION THEREOF

Francis M. Callahan, Stony Point, N. Y., assignor to American Cyanamid Company, New York, N. Y., a corporation of Maine No Drawing. Application January 30, 1956
Serial No. 562,034

4 Claims. (Cl. 260—268)

This invention relates to new salts of piperazine and to products containing the same.

Piperazine is widely used in pharmaceutical preparations and in the field of anthelmintics, usually in the form of one of its salts, such as piperazine hexahydrate. The material is extremely hygroscopic, making it unpleasant to handle in manufacturing operations. Owing to the hygroscopicity of piperazine hexahydrate, it attracts moisture to preparations containing it to the extent that, in some cases, the powdered material is transformed into a paste, which makes it impossible to handle in powder measuring devices, in weighing operations and the like. This tendency is particularly undesirable in filling soft gelatin capsules with powdered preparations. When substantial amounts of piperazine hexahydrate are present and under conditions of high humidity, it is difficult to carry out this operation. Also, the capsules do not present an attractive appearance on standing.

In addition, it is found that after encapsulation the piperazine hexahydrate appears to absorb moisture from the soft gelatin film of the capsule, resulting in unsatisfactory or defective capsules. These conditions may be evidenced in several ways, as by discoloration of the capsule due to bleeding of the dye as a result of the moisture transfer or irregularly shaped capsules.

Also, because of the hygroscopic nature of most presently available piperazine salts, the salts tend to liquify, which makes the product less desirable for handling and use.

Attempts have been made to overcome the hygroscopicity of piperazine by forming certain salts which are less hygroscopic than is piperazine hexahydrate. Examples of these salts are piperazine bitartrate and the dihydrogen citrate salt. These products, however, are more hygroscopic than is desirable, and there is a need for a better product for pharmaceutical manufacturing operations.

The present invention provides an improved, less hygroscopic piperazine salt, which is a free-flowing powder even at high relative humidities, and it can be handled by ordinary measuring and encapsulating equipment without special precautions being required because of the humidity. Furthermore, the product can be enclosed in soft gelatin capsules without damage to the capsule or without resulting in undue chemical reaction between the components of the encapsulated mixture as a result of excess moisture content drawn therein by a hygroscopic material.

The following table shows that of the piperazine compounds tested only four did not liquify in soft gelatin capsules after 24 hours at 10% relative humidity.

TABLE

| Type | Sealing | After 24 Hrs. FI at 10% Relativ Humidity |
|---|---|---|
| 1. Anhydrous Piperazine | Poor | Liquified. |
| 2. Anhydrous Piperazine in Cottonseed Oil. | Good | Do. |
| 3. Hexahydrate Piperazine | Poor | Do. |
| 4. Hexahydrate Piperazine in Cottonseed Oil. | ...do | Do. |
| 5. Piperazine Citrate | Good | Do |
| 6. Piperazine Citrate in Cottonseed Oil. | Poor | Do. |
| 7. Piperazine Bitartrate | Good | Do. |
| 8. Piperazine Bitartrate in Cottonseed Oil. | Poor | Do. |
| 9. Piperazine Mucate | Good | Powdery (did not liquify). |
| 10. Dipiperazine-butane-tetracarboxylate. | ...do | Do. |
| 11. Monopiperazine butane tetracarboxylate monohydrate. | ...do | Do. |
| 12. Monopiperazine butane tetracarboxylate anhydrate. | ...do | Do. |

The new non-hygroscopic salts of the present inventio are those prepared, for example, by reacting piperazine o the hexahydrate thereof with butanetetracarboxylic aci or mucic acid. Because butanetetracarboxylic acid is polycarboxylic acid, more than one salt is possible. T prepare the monopiperazine salt, a molecular equivalen or a slight excess of piperazine is employed. Othe piperazine salts are prepared in like manner, using mor than one molecular equivalent of piperazine. Illustratio of these processes will be given in the following examples Example 1

11.7 grams of butanetetracarboxylic acid were dissolve in 100 ml. of isopropanol. 9.7 grams of piperazine·6H$_2$( were dissolved in 50 ml. of isopropanol. The two solu tions were combined, and a white, crystalline materi appeared. A portion recrystallized from aqueous metl anol had the following analysis: Melting point ove 310° C.

Calc'd for: $C_{12}H_{20}N_2O_8 \cdot 2H_2O$: C, 40.45; H, 6.79; N 7.86; O, 44.90. Found: C, 40.16; H, 6.88; N, 7.83; C 45.13 (by diff.).

The above salt, monopiperazine butanetetracarboxylat when dried under reduced pressure over phosphoru pentoxide at slightly elevated temperatures can be ot tained in an anhydrous state.

Calc'd for: $C_{12}H_{20}N_2O_8$: C, 45.00; H, 6.29; N, 8.7! Found: C, 45.31; H, 6.56; N, 8.96.

Example 2

23.4 grams of butanetetracarboxylic acid were di: solved in 200 ml. of hot isopropanol. 38.8 grams c piperazine hexahydrate were dissolved in 100 ml. of hc isopropanol. The two solutions were combined, and white crystalline precipitate immediately appeared. Th material was collected in a Buchner funnel where it wa washed with isopropanol. The dipiperazine butanetetra carboxylate amounted to 42 grams after the last trace of isopropanol had evaporated. No attempt was mad to remove water of hydration. The melting point wa over 305° C.

Anal. calc'd for: $C_{16}H_{30}N_4O_8 \cdot 1\frac{1}{2}H_2O$: C, 44.33; F 7.67; N, 12.93; O, 35.07. Found: C, 44.77; H, 7.43; N 12.52; O, 35.28 (by diff.).

Example 3

21.0 grams of mucic acid and 38.8 grams of piperazine·6H$_2$O were suspended in 450 ml. of water and the suspension boiled. The boiling material was filtered and the filtrate diluted with 1000 ml. of acetone. The product slowly crystallized out, was collected by filtration and the residue dried by air. The monopiperazine mucate was prepared in a 92.8% yield by this method.

Calc'd for: C$_{10}$H$_{20}$N$_2$O$_8$: C, 40.54; H, 6.80; N, 9.46.
Found: C, 40.56; H, 7.13; N, 9.37.

I claim:
1. A member of the group consisting of monopiperazine butanetetracarboxylate, dipiperazine butanetetracarboxylate and monopiperazine mucate.
2. Monopiperazine butanetetracarboxylate.
3. Dipiperazine butanetetracarboxylate.
4. Monopiperazine mucate.

References Cited in the file of this patent

UNITED STATES PATENTS

| | | |
|---|---|---|
| 597,454 | Bishop et al. | Jan. 18, 1898 |

FOREIGN PATENTS

| | | |
|---|---|---|
| 6,033 | Great Britain | Feb. 9, 1895 |
| 18,981 | Great Britain | July 24, 1897 |
| 26,078 | Great Britain | Nov. 19, 1897 |

OTHER REFERENCES

Pollard et al.: J. Am. Chem. Soc., 56, pp. 1759–1760 (1934).